May 23, 1939.  W. T. DUNN  2,159,430
DRIVING MECHANISM
Filed Jan. 18, 1934  4 Sheets-Sheet 4

INVENTOR.
WILLIAM T. DUNN
BY
Harness, Lind, Patee & Harris
ATTORNEYS

Patented May 23, 1939

2,159,430

UNITED STATES PATENT OFFICE 2,159,430

DRIVING MECHANISM

William T. Dunn, Detroit, Mich., assignor to Chrysler Corporation, Detroit, Mich., a corporation of Delaware Application January 18, 1934, Serial No. 707,047

28 Claims. (Cl. 74—336)

This invention relates to driving mechanisms and refers more particularly, in one embodiment thereof, to improvements in power driving mechanisms for motor cars or vehicles, especially where it is desired to vary the driving speed ratio between the vehicle engine or prime mover and the propelling ground wheels.

One object of my invention resides in the provision of an improved driving mechanism adapted, under predetermined desired conditions, to automatically effect the drive for the vehicle. My driving mechanism is preferably adapted for use in connection with a speed ratio changing transmission of any desired type and is adapted to establish an auxiliary driving speed ratio for the vehicle, such as an overdrive ratio for example.

A further object of my invention resides in the provision of an improved overdriving or speed ratio changing mechanism adapted to automatically respond in its actuation to predetermined desired conditions of operation of the vehicle. Thus, by way of example, I have provided an overdrive which is automatically effective when the vehicle attains a predetermined speed so that, on reaching this critical speed, the overdrive becomes effective and, on falling below this critical speed, the overdrive becomes ineffective.

In carrying out the aforesaid objects of my invention, I have provided an improved form an arrangement of an auxiliary driving mechanism which, where an overdrive speed ratio is desired for the vehicle, is driven from the vehicle so as to be responsive to the speed thereof in its actuation. This auxiliary or overdrive mechanism is driven, when inoperative as a drive, at a speed less than that of a shaft or other part cooperating therewith and driven from the engine. Ordinarily, I prefer to arrange my auxiliary driving mechanism between driving and driven shafts or other parts respectively responsive in their actuation to the speeds of the engine and vehicle traveling speed, the auxiliary driving mechanism being thus driven, when inoperative, from the driven shaft and at a speed less than that of the driving shaft by the amount or ratio of overdrive desired.

In order to effect the aforesaid automatic engagement and disengagement of the drive through the auxiliary driving mechanism, I have provided a clutch which will automatically connect and release the clutch controlled parts of the auxiliary drive under predetermined desired conditions of relative speeds of the engine and vehicle, or driving and driven shafts. This automatic clutch is preferably of the type having a cage or core carrying one or more pawls or dogs responsive to centrifugal force at the desired critical speed for movement of the pawls into clutching relationship with a co-operating or companion clutch member or shell formed with suitable pawl engaging slots or openings, the pawl carrying cage being driven with either the engine driving shaft or the vehicle driven shaft and the slot carrying shell being driven with the other of these shafts. If desired, other types of clutches may be used to control the auxiliary driving mechanism within the broader aspects of my invention.

A further object of my invention resides in the provision of what may be termed primary driving means in addition to said auxiliary driving mechanism for driving the vehicle independently thereof, and in an improved form an arrangement, such means preferably being under manual control so that the drive may be established independently of the auxiliary drive and automatic clutch associated therewith. The primary driving means may thus provide the normal driving medium between the engine and vehicle drive either throughout the entire speed range of the vehicle or up to the aforesaid critical speed at which time the automatic clutch transfers the drive to and through the said auxiliary driving mechanism.

A still further object of my invention resides in the provision of an improved form and arrangement of overrunning or free wheeling clutch as a part of the aforesaid primary driving means. With such novel arrangement, the vehicle may overdrive the engine, the auxiliary and primary drives and parts associated therewith being arranged so that when engagement of the automatic clutch takes place to drive the vehicle through the auxiliary driving mechanism, the overrunning clutch is preferably thereby rendered simultaneously ineffective, the overrunning clutch and primary driving means being automatically effective when the automatic clutch releases its drive, as when the vehicle speed drops below the predetermined desired critical speed.

Another object of my invention resides in the provision of improved means responsive to manually controlled manipulation of the said speed ratio changing transmission into the transmission setting for reversing the normal direction of vehicle drive, for automatically locking out or rendering ineffective the said overrunning clutch, this means being preferably in addition to the aforesaid manually controlled means for the overrunning clutch or automatic clutch or both as may be desired in any particular installation.

As additional important features of my invention, I have provided a novel means of control for the automatic clutch and the overrunning clutch. Thus by reason of my invention, the vehicle driver may selectively manipulate the control so that, in addition to the aforesaid locking out of the overrunning clutch, the automatic clutch controlling the overdrive may be rendered ineffective either from an overdriving condition or from a condition of direct drive between the driving and driven shafts. This is accomplished in one embodiment of my invention by the provision of a shiftable controlling clutch device which controls the drive to one of the clutching members of the automatic clutch. This shiftable clutch device is thus selectively engageable with parts of the automatic clutch and the overrunning clutch so as to selectively control these clutches. The shiftable clutch device may also have an intermediate position of control whereby the overrunning clutch is operable but the automatic clutch is inoperable.

Where a power operated main clutch, such as the well known engine intake manifold vacuum operated clutch, is provided between the engine and transmission, I may further control the application of power to this main clutch by reason of the same manual control to the shiftable clutch device aforesaid. I deem it generally advisable in most instances to render the automatic power operation of the vacuum actuated main clutch ineffective when the shiftable clutch device is positioned for establishing the overdrive. I further prefer as a feature of my invention, in its more limited aspects, to render the main clutch ineffective in its response to automatic power operation when said shiftable clutch device is in its said intermediate position or in position to lock out the overrunning clutch or both. Thus, I am enabled through a common manually actuated lever or knob to control the vacuum clutch and also the overdrive and free wheeling clutches. From the teachings of my invention, various combinations of these controls may be utilized as desired and I do not limit my invention, in its broader aspects, to the particular embodiments hereinafter described in detail for illustrative purposes.

Further objects of my invention reside in the provision of an improved driving mechanism employing planetary gearing in combination with my aforesaid improvements of control for the overrunning and automatic clutches; and in the novel combination and arrangement of parts thereof more particularly hereinafter described and shown in several detailed embodiments in order to illustrate the principles of my invention, reference being had to the accompanying drawings in which:

Fig. 6 is a view corresponding to Fig. 5 illustrating the engaged or operating position of the clutch parts.

In the drawings, I have illustrated my driving mechanism A interposed between speed ratio changing transmission B and the driven shaft 10, the latter extending rearwardly to drive the rear wheels (not shown) of the motor car or vehicle in the usual well-known manner, it being understood that I have elected to show my invention in association with a motor vehicle drive, although my invention in its broader aspects is not necessarily limited thereto. Furthermore, my driving mechanism may be used to advantage at various other points in the line of general power transmission between the vehicle engine and the driven wheels, or between driving and driven means such as shafts of other types of devices. If desired, shaft 10 may transmit its drive through the usual propeller shaft brake drum 11, the latter having the usual brake band 12 associated therewith.

Figure 2:
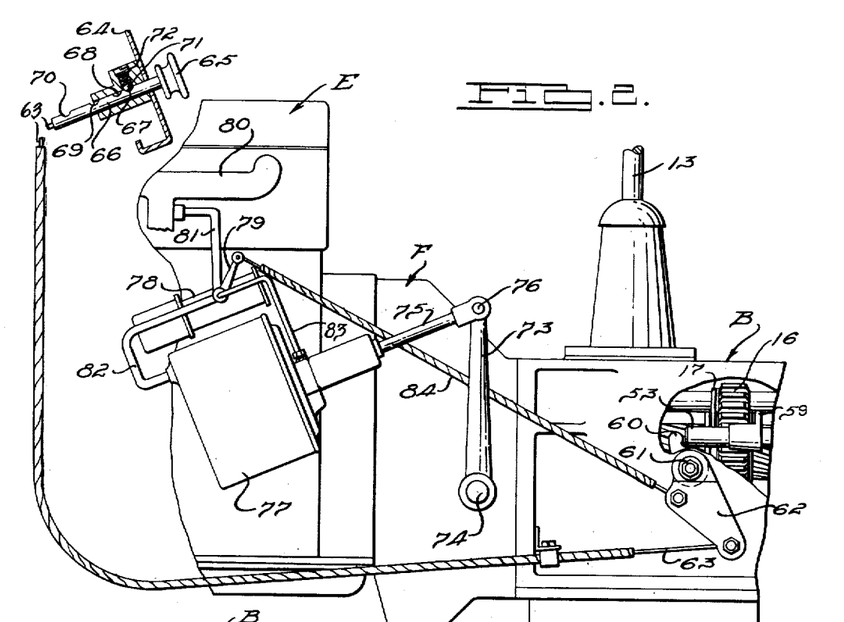
Fig. 2 is an elevational view showing a portion of the engine and transmission, illustrating the manual control for the shifting clutch and for the power operated main clutch, a portion of the transmission casing being broken away to show the transmission reversing gear for also operating the shifting clutch.

In Fig. 2 I have shown a portion of engine E, the usual main or primary clutch within clutch housing F being provided to control the drive from engine E to transmission B.

Figure 1:
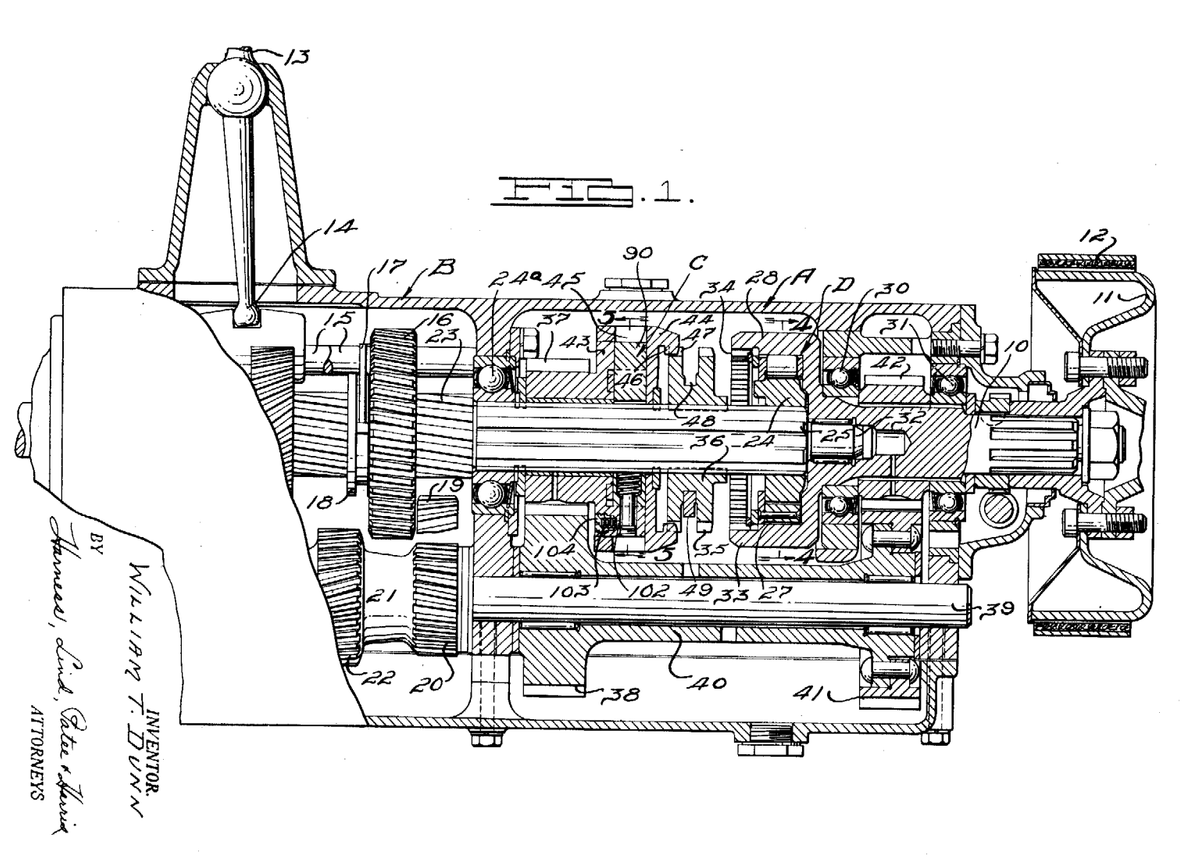
Fig. 1 is a sectional elevational view through my power transmission.

The transmission B may be of any suitable type such as the conventional selector type operated by the well-known shifter lever 13, the lower end 14 of which is illustrated in Fig. 1 as engaging the usual selector controls 15 whereby the various adjustments may be made to the transmission in order to provide the speed ratios in the line of drive through the transmission. Inasmuch as transmission B may for the most part be of general conventional construction and operation, I have shown only a portion of the gearing and controls of this transmission in Figs. 1, 2 and 3 wherein 16 represents the gear adapted to be shifted by arm 17 and collar 18 associated therewith, this gear being shifted to the right as viewed in Fig. 1 for engagement with the usual reverse idler gear 19 in order to effect a reverse drive from the normal direction of drive to the driven shaft 10. The idler gear 19 is in constant mesh with the driving reverse gear 20 of the countershaft 21. When gear 16 is engaged with countershaft gear 22 the transmission drive is in low or first gear ratio. Thus, by appropriate actuation of the shift lever 13, gears 16 and 19 may be engaged so as to reverse the drive, it being understood that other manipulations of shift lever 13 are adapted to selectively produce other desired speed ratio changes in the normal direction of rotation for driven shaft 10.

The power coming from the engine E and main clutch F drives transmission B and the power is taken from this transmission by a power driving means or shaft 23 rotatable in a bearing 24ᵃ, the shaft having a portion extending rearwardly into the driving mechanism A, this extending portion of the shaft being provided with splines 25. My driving mechanism A provides, among other things, an auxiliary driving means or mechanism between the driving and driven shafts 23 and 10 respectively, this driving means being preferably of a construction adapted to provide a speed ratio between the shafts of an overdriving character whereby driven shaft 10 may, under certain conditions hereinafter described, be driven from the driving shaft at a speed greater than a direct drive between these shafts, it being understood that the engine will in such instances be relatively slowed down with respect to its normal speed of actuation for a given speed of vehicle travel. If desired the mechanism A may be arranged to provide an underdrive instead of an overdrive, although I prefer to arrange the gearing for an overdrive of the driven shaft 10.

Figure 4:
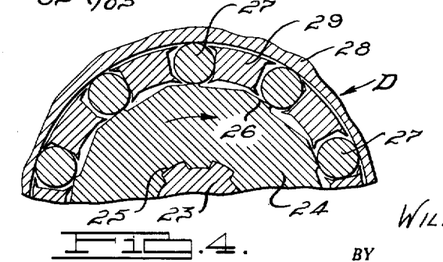
Fig. 4 is a sectional elevational view through a portion of the overrunning or free wheeling clutch, the section being taken along the line 4—4 of Fig. 1.

I preferably incorporate in my driving mechanism as a part of the primary driving means between driving shaft 23 and driven shaft 10, an overrunning or free wheeling clutch D best shown in Figs. 1 and 4. This clutch may in itself be of any suitable form, the illustration showing a conventional device in which the inner cam member 24 is driven by splines 25 of shaft 23, the cam faces 26 being engaged by cylinders 27 so that by the driving rotation of shaft 23 the high sides of cam faces 26 will wedge the cylinders 27 between cam member 24 and the outer cylindrical driven member 28 of the overrunning clutch to establish a direct drive thereto. The usual spacers 29 maintain the cylinders in spaced position, it being apparent that whenever the engine or driving shaft 23 slows down, the vehicle and driven shaft 10 may, by reason of clutch D overrun the driving shaft, other conditions permitting such action as will be presently apparent.

The cylindrical portion 28 of the overrunning clutch D is formed as a forward extension of driven shaft 10, bearings 30—31 rotatably supporting this shaft. This cylindrical portion is centered with, and forms a housing around the rear end 32 of driving shaft 23. This portion 28 also has a forward extension 33 provided with an annular series of internal teeth or jaws 34 complementary to corresponding teeth 35 of the shiftable clutch controlling device 36 splined to shaft 23, the arrangement being such that when clutch 36 is shifted to the right as viewed in Fig. 1, teeth 34 and 35 will engage so as to lock out or render the overrunning clutch D ineffective and inoperative. In such instances, it will be apparent that a direct drive is established between driving shaft 23 and driven shaft 10 through these engaging teeth and the outer portion 28 of the overrunning clutch D.

Freely mounted on shaft 10 at the front end of the overdrive mechanism B is a gear 37 driven by a gear 38 rotatable on a fixed countershaft 39 and having an integral sleeve 40 formed with a gear 41. The latter gear is driven by gear 42 keyed to shaft 23, the countershaft gearing 42, 41, 38 and 37 being thereby adapted to drive the pawl carrying cage 43 of the automatic clutch C from and with the driven shaft 10 when clutch C is disengaged. This countershaft gear train determines the overdrive ratio as will be presently apparent, and when shaft 23 is directly driving the shaft 10 through the overrunning clutch D, the automatic clutch C will be driven at a slower speed than that of the drive shaft 23, it being understood that in such instance clutch C is not in clutching position.

Loosely mounted on shaft 23 is a companion clutch member 44 of the automatic clutch C, the member 44 being in the form of a cylindrical sleeve or shell within which the cage 43 rotates relative to the shell 44 when clutch C is not engaged. This shell is provided with pawl receiving slots or openings 45 as will hereinafter be more apparent in connection with the detailed description of the automatic clutch C. Shell 44 is provided with teeth or jaws 46 engageable by similar teeth 47 of the clutch device 36 when the latter is shifted to the left to drive shell 44 from shaft 23 as in Fig. 1. In such position automatic clutch C is ready to operate.

Figure 3:
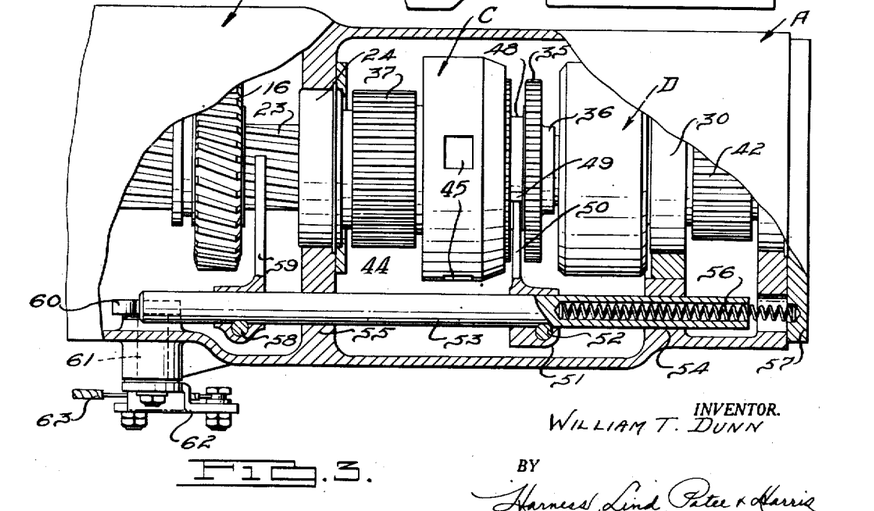
Fig. 3 is a plan view of the transmission as shown in Fig. 1, the casing being broken away to illustrate the reverse gearing and associated mechanism.

The clutch 36 is provided with an annular groove 48 engaged by a yoke 49 best shown in Fig. 3. This yoke extends laterally through an arm 50 to a hub 5 keyed or otherwise fixed at 52 to a shiftable rod 53 adapted to reciprocate in guides 54 and 55 provided by the casing of transmission B. The rear end of rod 53 is bored out to receive a spring 56 reacting against a fixed abutment 57, this spring 56 acting to normally move rod 53 to the left, as viewed in Fig. 3, to position the parts associated therewith as illustrated in Figs. 1, 2 and 3 of the drawings. Carried by rod 53 and also keyed thereto at 58 is an arm 59 extending laterally inwardly of transmission B, this arm being normally spaced from reversing gear 16 but being adapted for engagement therewith during movement of this reversing gear into its position of engagement with gear 19 for establishing the aforesaid reverse drive. The arrangement is such that when gear 16 is shifted as aforesaid to its position for establishing the reverse drive, arm 59 will be engaged by gear 16 and moved to the right as viewed in Figs. 1 and 3, thereby also moving rod 53 and yoke 49 to the right for shifting the clutch 36 along splines 25 of the drive shaft 23 to lock out the overrunning clutch D by engagement of teeth 34 and 35.

In addition to the aforesaid manually operated means for shifting the position of the clutch 36 in response to a setting of the reverse gearing of transmission B, I have also provided a further manually controlled means for shifting the clutch 36 independently of the movement thereof under the influence of the reverse setting of the transmission. To this end the rod 53 is adapted to be engaged by the upwardly extending arm or lever 60, this lever being pivotally mounted on a pin 61 with a downwardly extending arm 62 adapted for movement by suitable linkage such as the Bowden wire 63. This wire, as diagrammatically illustrated in Fig. 2, extends for convenient manipulation by the vehicle driver, such position being indicated by the usual vehicle dash 64 which mounts a handle or knob 65 connected to the other end of the Bowden wire 63. The handle 65 is adapted for movement by the hand of the vehicle driver, the knob being guided from its position illustrated in Fig. 2 to a series of selective positions in spaced relationship from dash 64, in which extended positions the guide portion 66 of the handle successively registers notches 67, 68, 69 or 70 thereof with spring pressed ball 71 carried by guide block 72. The ball 71 and the notches cooperate to advise the operator of the proper selective positioning of handle 65 for effecting the desired swinging of lever 62 about its pivot 61. This swinging movement of the lever will, when notch 70 is engaged by ball 71, move rod 53 against spring 56 to shift the clutch 36 independently of the movement of the reverse gear 16 to manually lock out the free wheel clutch D.

When notch 69 is engaged by ball 71, rod 53 is actuated to shift clutch 36 to an intermediate position free from engaging teeth 46 or 34, in which position the automatic clutch C is inoperative but overrunning clutch D is operative.

When notch 68 is engaged by ball 71, rod 53 is not actuated to shift clutch 36, the latter clutch remaining in the position illustrated in Figs. 1 and 3 when either of notches 67 or 68 are engaged by the ball. Such action is permitted by a clearance between lever 60 and rod 53 with notch 67 engaged by ball 71 as shown in Figs. 2 and 3. This clearance is taken up when handle 65 is moved to position notch 68 with the ball. During this clearance take-up, lever 62 is moved sufficiently to render the power actuation of clutch F ineffective whereby handle 65 controls this main clutch.

In Fig. 2 the clutch F is adapted to be released or declutched by lever 73 which actuates shaft 74 extending to the well-known clutch release means (not shown). Lever 73 is actuated by a rod 75 pivoted thereto at 76, this rod being pulled by a motor 77 illustrated as a conventional vacuum actuator of well-known commercial form. This actuator has a control valve generally designated at 78 adapted to be actuated by lever 79 for controlling the vacuum from engine intake manifold 80 through pipes 81 and 82, the latter leading from valve 78 to the vacuum operator 77. The usual dash pot pipe 83 is provided for properly governing the clutch movement of lever 73 when the vacuum is relieved. The valve control lever 79 is connected by suitable linkage such as Bowden wire 84 to lever 62 so that when handle 65 is moved outwardly to engage either of notches 68, 69, 70, valve 78 will cut out the vacuum to actuator 77. It should be understood that clutch releasing shaft 74 is preferably also provided with a clutch releasing pedal of well-known form and operation in present commercial types of vacuum operated clutch systems, this pedal being omitted from my disclosure.

Figure 5:
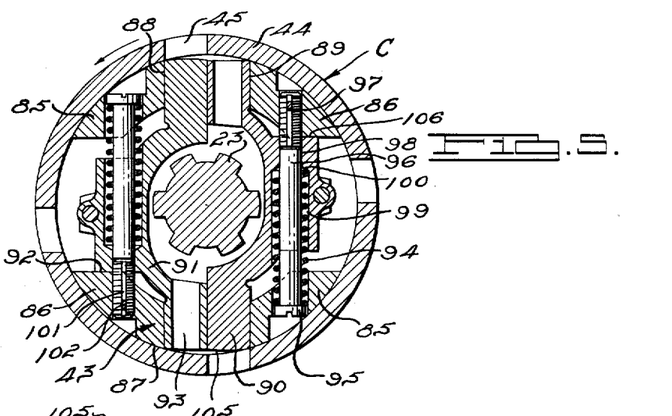
Fig. 5 is a sectional view through the automatic clutch, the section being taken along the line 5—5 of Fig. 1.

Referring now to the details of clutch C which is preferably of the automatic type, one form of which is shown in Figs. 5 and 6, the gear 37 and cage 43 are provided with diametrically arranged pairs of lateral extensions or pawl guides 85 and 86, these extensions having arcuate faces 87 fitting within shell 44. Extensions 85 have pawl engaging faces 88 and extensions 86 have similar bearing faces 89. Fitting within shell 44 are a pair of pawls 90, each having a face in sliding engagement with a face 88 of extension 85 and each extending generally inwardly of the pawl carrying cage 43. Thus each pawl is formed with a yoke portion 91 normally seated at 92 on an extension 86, each yoke portion having a guide 93 slidable intermediate a face 89 and the side of the other pawl opposite the side thereof in engagement with the face 88.

In order to normally urge the pawls inwardly of the pawl cage to position the parts as shown in Fig. 5, springs 94 are provided, each spring reacting on the head 95 of the screw bolt 96 threadedly engaging opening 97 in extension 86 and yoke portions 91 are respectively provided with openings 98 and 99 aligned with opening 97, each spring 94 acting on a seat 100 of the associated yoke portion 91.

The shell 44 has the aforesaid plurality of circumferentially spaced pawl receiving slots or openings 45 suitably spaced so that diametrically arranged pairs of slots will simultaneously register with the pawls 90 so as to receive said pawls under conditions hereinafter more apparent.

The threaded ends of screw bolts 96 are each slotted at 101 to receive the detent 102, shown in Figs. 1 and 5, this detent being urged toward the slot by a spring 103 abutting set screw 104. It will be apparent that the pawl springs 94 may be readily reached and adjusted from without shell 44 by aligning each of the bolt heads 95 with one of the slots 45. Prior to rotatably adjusting the screw bolts, the locks 102 associated therewith are released by removing the tension of springs 103 by partially threading the set screws 104 outwardly. The screw bolts 96 may then be rotated to further compress or relieve the springs 94 to effect the desired setting governing the action of the pawls after which the detents 102 are restored to their positions locking the associated bolts against accidental displacement. Furthermore, by aligning any bolt 96 with one of the shell openings 45 the bolt and spring 94 may be readily removed and replaced without tearing down the clutching parts. The outer ends of pawls 90 are preferably provided with cam faces 105 acting on the inner edges of slots 45 to progressively release the pawls outwardly when the clutch shell and cage are rotating substantially together at a predetermined speed. When pawls 90 move outwardly in slots 45, such movement is limited by engagement of yoke portions 106 with projections 86, the yoke portions sliding on bolts 96.

In operation of the power transmitting mechanism, with the parts positioned as in Fig. 1, the engine will drive shaft 23 and hence the driven shaft 10 to drive the vehicle forwardly in direct drive so far as the driving and driven shafts 23 and 10 respectively are concerned. This direct drive takes place from shaft 23, through the free wheel clutch D and thence to driven shaft 10. When the vehicle tends to overrun the engine such action may take place by reason of clutch D. During this direct drive the shell 44 will be driven by clutch 36 at the speed of shaft 23 while the pawls will be rotated by gear 37 at a speed less than that of the driven shaft 10 and driving shaft 23 by reason of the reduction through the countershaft gear train 42, 41, 38 and 37.

By way of illustrating one manner of operation of my automatic clutch C, this clutch is illustrated as being adapted to automatically lock out or to render the free wheel clutch D ineffective and to simultaneously drive shaft 23 with gear 37 at a predetermined speed of rotation of shaft 10 and hence a predetermined speed of vehicle travel. When such clutching action takes place, the shaft 10 is driven from gear 37 as aforesaid by reason of the countershaft gear train. This drive provides an overdrive or a higher speed of the driven shaft 10 than that of the driving shaft 23. An overdrive is ordinarily desirable at only relatively high speeds of vehicle travel and hence, by a suitable selection and setting of the pawl springs 94, these pawls may be held inoperative against the influence of centrifugal forces acting to move the pawls outwardly until the desired predetermined critical speed has been reached. Assuming, by way of example, that such automatic overdrive is desired at approximately 50 miles per hour of vehicle travel, then, when the vehicle is being driven at this speed, the pawls are urged outwardly by centrifugal force to engage slots 45 of shell 44 when rotation of the pawl cage and shell becomes substantially uniform. Under the assumed conditions, springs 94 may be set so that the pawls tend to fly outwardly at a speed of shaft 10 corresponding to 50 miles per hour of vehicle travel, the pawls being restrained from moving outwardly, until the clutch parts are synchronized, by reason of the gear reduction which drives the pawls at a slower speed than that of slots 45 which are driven directly from the drive shaft 23 when shifting clutch 36 is positioned as in Fig. 1. Owing to the difference in rotation speeds of the slots and pawls, these parts pass each other with such rapidity that the pawls do not have time to move outwardly to engage the slots and the parts continue to slip until the operator momentarily releases or diminishes the power of the engine applied to shaft 23 so as to permit the shell 44 to decelerate. In decelerating, the shell 44 obviously very quickly drops to the speed of the pawl cage 43, momentarily synchronizing the pawls with a pair of diametrically arranged slots 45, the pawls thereupon being guided out during rotation thereof by cam faces 105 for effecting initial engagement of the pawls in the slots. Once engaged, the centrifugal force acting on the pawls carries them outwardly for fully engaging the slots of shell 44 and the overdrive immediately takes place with the free wheel clutch D locked out as aforesaid.

As long as the engine drives the vehicle at or above the aforesaid overdrive speed, with the pawls 90 engaged in slots 45, the clutch C will remain engaged. However, when the vehicle slows down below the aforesaid 50 miles per hour, in the assumed illustration, the pawls 90 will be urged to their retracted or normal position of Fig. 5, such retraction taking place just as soon as the friction of the drive is relieved or reversed between the sides of the slots and pawls. Thus when the vehicle driver momentarily releases the usual accelerator pedal to cause the vehicle to drive the engine this reversal of drive permits retraction of the pawls and the power transmission is then again operating without the overdrive and through the free wheeling clutch D.

When it is desired to drive the vehicle in reverse, shifter 13 is moved to release any gear ratio previously established and is then moved to shift gear 16 into engagement with the reverse idler gear 19. This causes rearward movement of arm 50 to move clutch 36 to the right, as viewed in Fig. 1, so as to disengage teeth 46 and 47 and to engage 34 and 35 to lock out the free wheel clutch D. This reverse drive thus passes from shaft 23 to clutch 36, driven member 28 and thence to the driven shaft 10, it being understood that shaft 10 has its rotation reversed by the reversing mechanism of the transmission. The clutch 36 may also be actuated to lock out the overrunning clutch D by shifting rod 53 independently of movement of gear 16 by reason of the handle 65. When this handle is pulled to engage notch 70 with ball 71 the overrunning clutch is locked out.

In addition to the aforesaid shifting positions of control clutch 36 into its extreme forward and rearward positions either or both of the following features of my control may be employed in the driving mechanism. Thus, in operation, when handle 65 is pulled to engage notch 68 with ball 71, lever 62 moves to take up the clearance between lever 60 and rod 53, the clutch 36 remaining in the Fig. 1 position, Bowden wire 84 being actuated to cause valve 78 to close the communication between pipes 81 and 82. In this manner the power actuation of clutch F is rendered ineffective, this clutch F being then operable by the aforesaid usual clutch pedal. I prefer to render clutch F inoperable by the vacuum cylinder 77 whenever any of the notches 68, 69 and 70 are engaged by ball 71 and my illustrated arrangement of parts is in accordance therewith.

When notch 69 engages ball 71, control clutch 36 is shifted to its intermediate position between teeth 46 and 34 but not meshing with either of these teeth. In such position the automatic clutch C is rendered inoperative since shell 44 is no longer driven by shaft 23 although the overrunning clutch D is operative for its aforesaid functions. The operator may thus release the automatic clutch C even from a condition of overdriving.

I desire to point out that instead of driving the slot carrying shell 44 directly from the drive shaft 23 and hence from the engine, and the pawl cage 43 from the driven shaft 10, such parts may be readily reversed if desired so as to drive the pawl cage directly from the engine and the slots from the vehicle or driven shaft 10. The illustrated arrangement is preferred, however, where an automatic clutch is used in an overdrive mechanism, since the engine continues to drive at the overdrive speed from the time when the pawls are engaged in the pawl slots viz. at a speed slower than in direct drive for the same vehicle speed. With the suggested reversal of clutch parts, the engine would have to operate considerably faster, by the overdrive ratio, than the driven shaft to speed up the slot carrying member and then by slowing down the engine momentarily to reduce the speed of the pawl cage to that of the slot carrying member, the pawls will engage the slots. In such instance it is therefore apparent that the engine would have to drive at a speed greater than its speed for the overdrive setting of the pawls in order to establish the proper conditions for effecting actuation of the automatic clutch C.

While I have illustrated my invention in connection with an overdrive mechanism for motor vehicles, I desire to point out that this is but one useful application or use of my driving mechanism which may be used to advantage wherever a clutching action between two rotatable parts is desired, particularly where such action is to be automatically responsive to desired conditions of relative rotatable speeds of the two members to be clutched or declutched.

While I do not limit my invention, in its broader aspects, to a clutch C of the automatic type or to any particular relationship of spring forces and centrifugal forces acting on the pawls of an automatic type of clutch, I prefer to incorporate an automatic clutch as a part of my invention and to provide the pawls thereof in substantially balanced or floating condition at the speed of rotation of the pawl cage where clutching action is desired. Thus, I prefer to arrange the spring rate so that at the critical speed of clutch engagement, the centrifugal force acting on any pawl will be substantially counterbalanced by the pull of the pawl spring so that the pawl can readily move outwardly into clutching position. At the end of the outward displacement of the center of gravity of any such pawl, the pawl is preferably also substantially counterbalanced by the inward pull of the spring associated therewith. Centrifugal force is proportional to the distance of the center of gravity of a rotating mass from its axis, and the increase of this force due to the increase of the center of gravity distance is counterbalanced by an increase of the spring load occasioned by the pawl movement. The spring rate is thus preferably one which balances the increase in centrifugal force during outward pawl movement.

Figures 7, 8, 9:
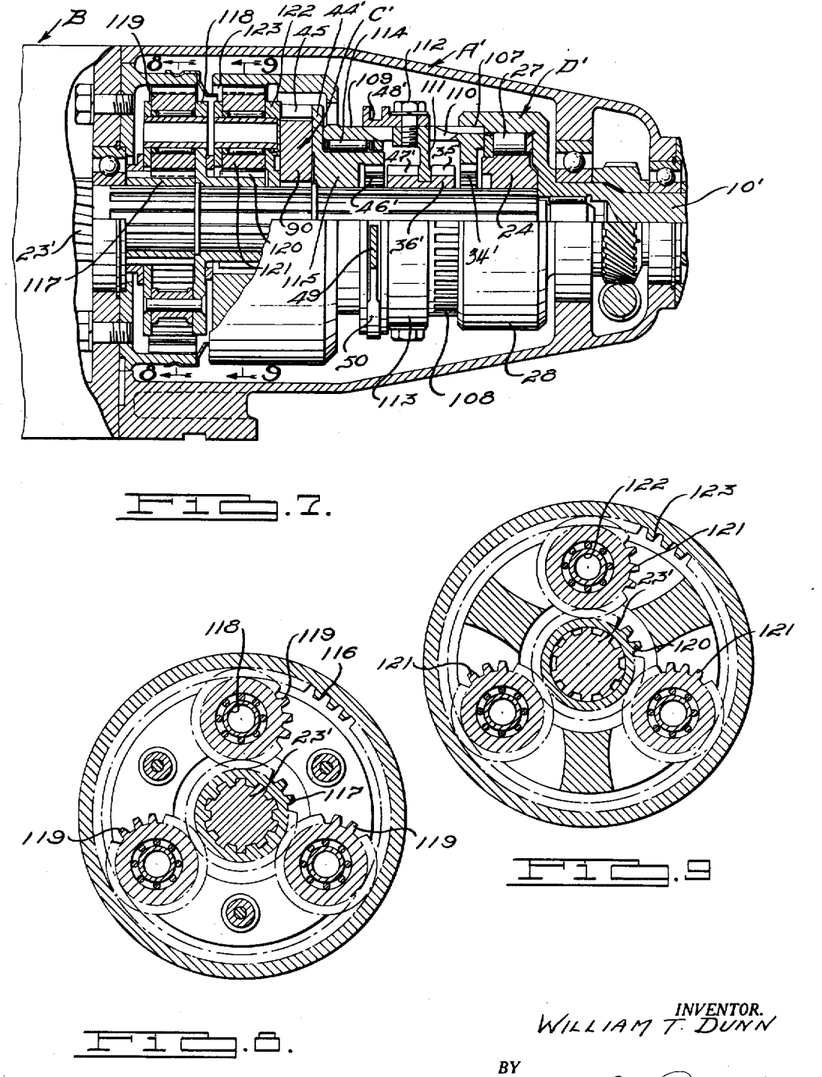
Fig. 7 is a sectional elevational view of a modified form of my driving mechanism in which the auxiliary driving gearing is provided by planetary gearing.
Fig. 8 is a sectional elevational view through one of the planet gear sets of Fig. 7, the section being taken along line 8—8 of Fig. 7.
Fig. 9 is a sectional elevational view through another of the planet gear sets, the view being taken along the line 9—9 of Fig. 7.
Figure 8:
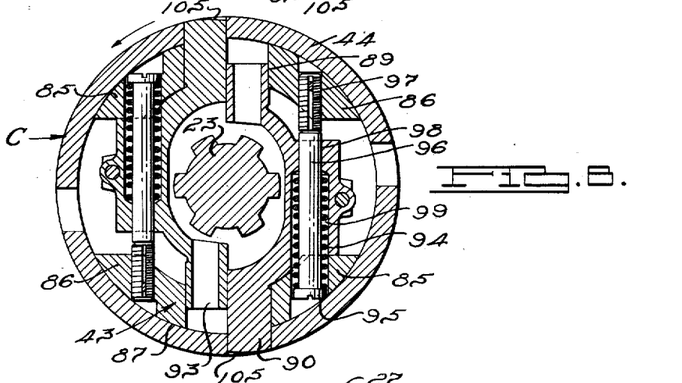

Referring to Figs. 7 to 9, I have illustrated a further embodiment of my invention wherein the overdrive mechanism A' intermediate the driving shaft 23' and driven shaft 10' includes planetary gearing instead of the countershaft gearing of Fig. 1. In Fig. 7 the free wheeling clutch D' is similar in construction and operation to clutch D of Fig. 1, the clutch D' having the same inner driving cam member 24 and outer driven portion 28 with intermediate cylinders 27. The outer portion 28 has teeth 107 at all times drivingly engaging teeth 108 of a sleeve 109, the latter having annular clutching teeth 34'. Sleeve 109 has a slot 110 through which shift arm 111 projects for engagement with the shifting clutch 36' splined on driving shaft 23'. Arm 111 is secured by fastener 112 to shifting sleeve 113 having groove 48' for receiving the same yoke 49 which in Fig. 1 engages the corresponding groove 48. The sleeve 113 is slidable along sleeve 109, the latter being mounted by a bearing 114 on the hub 115 of the slot carrying shell 44', the latter being rotatably mounted on shaft 23' and having clutching teeth 46'.

The clutch 36' has clutching teeth 35' and 47' respectively selectively engageable with teeth 34' and 46'.

Fixed to the casing housing the overdrive mechanism is an internal gear 116 of the forward planetary gear set best shown in Figs. 7 and 8, this gear set comprising a sun gear 117 carried by and driven with shaft 23' and a planet carrier 118 having planet gears 119 meshing with gears 116 and 117. The planet carrier 118 has a hub forming a rotatable sun gear 120 of the rearward planetary gear set best shown in Figs. 7 to 9. This gear set has sun gear 120 free of driving engagement with shaft 23', this sun gear actuating planet gears 121 carried by planet carrier 122, gears 121 also meshing with internal gear 123 formed as a part of sleeve 109.

In Fig. 7 the clutch C' may be similar in construction and operation to the aforesaid clutch C of Fig. 1, the clutch C' having its cage and associated pawls 90 driven by planet carrier 122 instead of by gear 37 in Fig. 1. Pawls 90 are likewise adapted for engagement in pawl receiving slots 45 formed in shell 44'.

The operation of the auxiliary or overdriving mechanism of Figs. 7 to 9 is, in general, similar to that described in detail in connection with Figs. 1 to 6 and will be omitted herein to avoid duplication. It should be understood that the mechanism A' is intended, in the illustrated embodiment of my invention, to be substituted for the corresponding mechanism A in the Fig. 1 and Fig. 2 arrangement of parts and the parts designated by prime reference characters in Figs. 7 to 9 corresponding in function to similar parts designated by non-prime reference characters in Figs. 1 to 6. Thus, the arm 50 of Fig. 7 is adapted to shift clutch 36 by the aforesaid manual actuation of the dash button 65 and by shifting lever 13 (of Fig. 1) into the reverse position as will be readily apparent.

In Fig. 7 the clutch 36' is in the intermediate position obtained by engaging notch 69 with ball 67, it being apparent that shell 44' is not driven by shaft 23' and therefore the automatic clutch C' is rendered inoperative. In such position shaft 23' drives shaft 10' through the overrunning clutch D', the latter being rendered inoperative for overdriving functions by shifting clutch 36' to engage teeth 35' with teeth 34'. When clutch 36' is shifted forwardly to engage teeth 46' and 47', the automatic clutch C' is in condition to operate when pawls 90 and slots 45 are substantially synchronized at the desired critical speed of rotation of shafts 23' and 10'. Also, the vacuum operated main clutch control of Fig. 2 may obviously be controlled by manually shifting clutch 36' as referred to.

In Figs. 7 to 9 I have illustrated a double planetary system of overdrive gear in order to provide the generally desired relatively low overdrive gear ratio and at the same time avoiding the necessity for using gears of relatively large diameter.

With the parts positioned as shown in Fig. 7, the planet gears 119 are rotated in the direction of rotation of shaft 23' but at a slower speed, the sun gear 120 of the second planetary gear set rotating planet carrier 122 thereof and hence pawls 90 at a further reduction. Internal gear 123 is rotated at all times with the driven shaft 10' and since sun gear 120 is driven at a speed less than that of driving shaft 23' and in the same direction, the effective gear ratio reduction in driving the pawls from driven shaft 10' is less than would be the case where the first planetary set were omitted and sun gear 120 were driven directly from shaft 23'. In order to reduce the amount of overdrive, the first planetary gear set is thus preferably provided. Other arrangements of gear ratios may also be provided as desired in any particular instance.

Since shell 44' is not being driven, the parts being in the Fig. 7 position, the pawls 90 will slip past slots 45 and the automatic clutch C' will not engage. Also, with clutch 36' in this intermediate position, the vacuum clutch control, when used, is preferably ineffective as aforesaid.

When clutch 36' is shifted forwardly or to the left as viewed in Fig. 7 then shell 44' and slots 45 thereof are driven at the speed of rotation of driving shaft 23'. By reason of the planetary gearing, the pawls 90 will, below the critical speed for engagement of clutch C', be driven from driven shaft 10', such drive being also supplemented by the drive to sun gear 120 from gear 117 so that the pawls will be driven at a speed of rotation less than that of driven shaft 10' by an amount of ratio provided by the planetary gearing. When the desired critical speed of vehicle travel is reached with the corresponding speed of rotation of driven shaft 10' the driving shaft 23' is momentarily slowed down as before described to synchronize the pawls and slots of the automatic clutch to effect engagement thereof. At such time the overrunning clutch D' becomes ineffective and driving shaft 23' will drive driven shaft 10' through the planetary gearing at a ratio greater than 1 to 1 by the amount of gear reduction provided by the planetary sets. This overdrive is established from driving shaft 23' through clutch 36' to shell 44', thence through automatic clutch C' to planet carrier 122 and planet gears 121 thereof. Planet gears 121 are also driven from gear 120 of the planet carrier 118 of the first said planetary gear set, the resultant drive passing from planet gears 121 to internal gears 123 and thence to driven shaft 10'. When the vehicle speed drops below the predetermined desired critical speed, the automatic clutch C' is disengaged and the drive is automatically then transferred through free wheeling clutch D' in a manner similar to the operation described in connection with the corresponding parts in the Figs. 1 to 6 embodiment.

I do not limit my invention, in the broader aspects thereof, to the particular combination and arrangement of parts shown and described for illustrative purposes since various modifications will be apparent within the teachings of my invention as defined in the appended claims.

What I claim is:

1. In a driving mechanism for a motor vehicle, power driving means, means driven by said power driving means and adapted to drive the vehicle, an overrunning clutch between said driving and driven means adapted to transmit a direct drive from said driving means to said driven means and to permit said driven means to overrun said driving means, supplemental driving means adapted for drivingly connecting said driving means and said driven means for driving said driven means from said driving means at a speed ratio greater than that provided by said overrunning clutch, clutch means including structures drivingly associated with said supplemental driving means for controlling the drive through said supplemental driving means, and manually controlled clutch means driven by one of the first two means aforesaid and adapted for selective positioning to drivingly connect said driving and driven means and to drivingly connect one of said clutching structures to one of the first two means aforesaid for selectively rendering said clutch means and said overrunning clutch ineffective.

2. In a driving mechanism for a motor vehicle, power driving means, means driven by said power driving means and adapted to drive the vehicle, an overrunning clutch between said driving and driven means adapted to transmit a direct drive from said driving means to said driven means and to permit said driven means to overrun said driving means, supplemental driving means adapted for drivingly connecting said driving means and said driven means for driving said driven means from said driving means at a speed ratio different from that provided by said overrunning clutch, clutch means including clutch structures drivingly associated with said supplemental driving means for controlling the drive through said supplemental driving means, and manually controlled clutch means including a clutching device driven by said driving means and adapted to drivingly connect said driving and driven means and to drivingly connect one of said clutching structures with one of the first two means aforesaid for selectively rendering said clutch means and said overrunning clutch ineffective.

3. In a driving mechanism for a motor vehicle, power driving means, means driven by said power driving means and adapted to drive the vehicle, an overrunning clutch between said driving and driven means adapted to transmit a direct drive from said driving means to said driven means and to permit said driven means to overrun said driving means, supplemental driving means adapted for drivingly connecting said driving means and said driven means for driving said driven means from said driving means at a speed ratio greater than that provided by said overrunning clutch, clutch means controlling said supplemental driving means, said clutch means including clutching members respectively driven with said driving means and said driven means, a clutch device driven by one of the first two means aforesaid and means for selectively shifting said clutch device to a plurality of positions to respectively provide the drive to one of said members and to drivingly connect said driving and driven means for locking said overrunning clutch against overrunning action, said clutch means being adapted, when said clutch device is positioned to drive one of said clutching members, to engage said members automatically in response to a predetermined synchronization of the rotation of said clutching members.

4. In a driving mechanism for a motor vehicle of the type having a speed ratio controlling transmission, power driving means, means driven by said power driving means and adapted to drive the vehicle, an overrunning clutch between said driving and driven means, supplemental driving means including a gear train adapted to drivingly connect said driving means and said driven means for establishing a driving speed ratio therebetween different from that provided by said overrunning clutch, clutch means including clutching structures drivingly associated with said supplemental driving means for controlling the drive through said supplemental driving means, a clutch device driven by one of the first two means aforesaid and adapted for selective movement to drivingly connect said driving and driven means and to drivingly connect one of said clutching structures to one of the first two means aforesaid whereby to control said clutch means and said overrunning clutch, manually operated means for moving said clutch device selectively into positions for controlling said clutch means and said overrunning clutch, and means responsive to actuation of said transmission into reverse for moving said clucth device to control said overrunning clutch.

5. In a driving mechanism for a motor vehicle, a power driving shaft, a shaft driven by said driving shaft, and adapted to transmit the drive therefrom to actuate the vehicle, an overrunning clutch including driving and driven members respectively connected to said driving and driven shafts, an automatically actuated clutch including a member adapted to be driven from said driving shaft and a second member adapted to be driven from said driven shaft, reduction gearing for driving said second member of the automatc clutch from said driven shaft, a clutch device driven by said driving shaft, and means for selectively moving said clutch device into position to drive said first member of the automatic cluch and into a second position to drivingly connect said driving shaft with said driven member of the overrunning clutch.

6. In a driving mechanism for a motor vehicle, a power driving shaft, a shaft driven by said driving shaft and adapted to transmit the drive therefrom to actuate the vehicle, an overrunning clutch including driving and driven members respectively connected to said driving and driven shafts, an automatically actuated clutch including a member adapted to be driven from said driving shaft and a second member adapted to be driven from said driven shaft, reduction gearing for driving said second member of the automatic clutch from said driven shaft, a clutch device shiftably movable relatively to both of said automatic clutch members and being driven by said driving shaft, and adapted to transmit a drive from said driving shaft to drive said first member of the automatic clutch, and means for moving said clutch device into position to drivingly connect said driving shaft with said driven member of the overrunning clutch, said automatically actuated clutch including means responsive to a predetermined synchronization of the speeds of rotation of said automatic clutch members for drivingly engaging said members when said clutch device is in said first position whereby to overdrive said driven shaft from said driving shaft.

7. In a driving mechanism for a motor vehicle, a power driving shaft, a shaft driven by said driving shaft and adapted to transmit the drive therefrom to actuate the vehicle, an overrunning clutch including driving and driven members respectively connected to said driving and driven shafts, an automatically actuated clutch including a member adapted to be driven from said driving shaft and a second member adapted to be driven from said driven shaft, reduction gearing for driving said second member of the automatic clutch from said driven shaft, a clutch device driven by said driving shaft, and adapted to transmit a drive from said driving shaft to drive said first member of the automatic clutch, and means for moving said clutch device into position to drivingly connect said driving shaft with said driven member of the overrunnnig clutch, said automatically actuated clutch including means responsive to a predetermined synchronization of the speeds of rotation of said automatic clutch members for drivingly engaging said members when said clutch device is in said first position whereby to overdrive said driven shaft from said driving shaft, said selectively moving means for said clutch device being adapted to move said clutch device into a further position free from driving connection with said first member of the automatic clutch and also free from driving connection with said driven member of the overrunning clutch.

8. In an engine operated vehicle driving mechanism having a power operated clutch, a driving shaft driven by the engine through said clutch, a shaft driven from said driving shaft and adapted to drive the vehicle, overrunning clutch means drivingly connecting said shafts to provide a one-way drive therebetween, clutch means actuatable to drivingly connect said shafts to provide a two-way drive therebetween, and common manually operated means for controlling the actuation of said power operated clutch and said clutch means.

9. In a driving mechanism for a motor vehicle, power driving means, means driven by said driving means and adapted to transmit the drive therefrom to actuate the vehicle, an overrunning clutch including driving and driven members respectively drivingly connected to said driving means and to said driven means and adapted to transmit a direct one-way drive therebetween, an automatically actuated clutch including clutching members adapted respectively to be driven from said driving means and from said driven means, a plurality of means adapted respectively to drive said clutching members from said driving and driven means and for driving said driven means from and faster than said driving means when said automatically actuated clutch is engaged, one of said plurality of driving means including reduction gearing for driving one of said clutching members at a speed different from that of the other of said clutching members when said driven means is driven from said driving means through said overrunning clutch, and manually operated means including a movable clutching device drivingly connected to one of the first two means aforesaid and adapted for shifting movement relative to each of said clutching members to establish a driving connection between said driving and driven means whereby to render said overrunning clutch ineffective, said clutching device providing a driving connection between one of the first two means aforesaid and one of said plurality of driving means when said clutching device is in at least one of its positions of movement.

10. In a driving mechanism for a motor vehicle, power driving means, means driven by said driving means and adapted to transmit the drive therefrom to actuate the vehicle, an overrunning clutch including driving and driven members respectively drivingly connected to said driving means and to said driven means and adapted to transmit a direct one-way drive therebetween, an automatically actuated clutch including clutching members adapted respectively to be driven from said driving means and from said driven means, a plurality of means adapted respectively to drive said clutching members from said driving and driven means, one of said plurality of driving means including reduction gearing for driving one of said clutching members at a speed different from that of the other of said clutching members when said driven means is driven from said driving means through said overrunning clutch, one of said plurality of driving means including a clutch device adapted for shifting movement relatively to each of said clutching members to drivingly connect said driving and driven means to provide a direct two-way drive therebetween, and means for manually shifting said clutch device.

11. In a driving mechanism for a motor vehicle, power driving means, means driven by said driving means and adapted to transmit the drive therefrom to actuate the vehicle, an overrunning clutch including driving and driven members respectively drivingly connected to said driving means and to said driven means and adapted to transmit a direct one-way drive therebetween, an automatically actuated clutch including clutching members adapted respectively to be driven from said driving means and from said driven means, a plurality of means adapted respectively to drive said clutching members from said driving and driven means and for driving said driven means from and faster than said driving means when said automatically actuated clutch is engaged, one of said plurality of driving means including reduction gearing for driving one of said clutching members at a speed different from that of the other of said clutching members when said driven means is driven from said driving means through said overrunning clutch, and manually operated means including a shiftable clutching structure driven by one of the first two means aforesaid and adapted for selective manual shifting movements independently of each of said clutching members, said clutching structure providing a driving connection with one of said clutching members in at least one position of movement thereof and establishing a two-way driving connection with the other of the first two said means in another position of movement thereof.

12. In a driving mechanism for a motor vehicle, power driving means, means driven by said driving means and adapted to transmit the drive therefrom to actuate the vehicle, an overrunning clutch including driving and driven members respectively drivingly connected to said driving means and to said driven means and adapted to transmit a direct one-way drive therebetween, an automatically actuated clutch including clutching members adapted respectively to be driven from said driving means and from said driven means, a plurality of means adapted respectively to drive said clutching members from said driving and driven means, one of said plurality of driving means including reduction gearing for driving one of said clutching members at a speed different from that of the other of said clutching members when said driven means is driven from said driving means through said overrunning clutch, and manually operated means including a movable clutching device drivingly connected to one of the first two means aforesaid and adapted for movement to establish a direct two-way driving connection between said driving and driven means whereby to render said overrunning clutch ineffective, said clutching device providing a driving connection between one of the first two means aforesaid and one of said plurality of driving means when said clutching device is in at least one of its positions of movement, said clutching device having an intermediate position of movement thereof free from driving connection between any of the means aforesaid, said overrunning clutch providing said one-way drive when said clutching device is in said intermediate position.

13. In a driving mechanism for a motor vehicle, power driving means, means driven by said driving means and adapted to transmit the drive therefrom to actuate the vehicle, an overrunning clutch including driving and driven members respectively drivingly connected to said driving means and to said driven means, an automatically actuated clutch including clutching members adapted respectively to be driven from said driving means and from said driven means, a plurality of means adapted respectively to drive said clutching members from said driving and driven means, one of said plurality of driving means including reduction gearing for driving one of said clutching members at a speed different from that of the other of said clutching members when said driven means is driven from said driving means through said overrunning clutch, manually operated means including a movable clutching device drivingly connected to one of the first two means aforesaid and adapted for movement to establish a driving connection between said driving and driven means whereby to render said overrunning clutch ineffective, said clutching device providing a driving connection between one of the first two means aforesaid and one of said plurality of driving means when said clutching device is in at least one of its positions of movement, a power operated clutch for controlling the drive through said power driving means, and means responsive to operation of said manually operated means for selectively rendering said power operated clutch operative and inoperative.

14. In a driving mechanism for a motor vehicle, power driving means, means driven by said driving means and adapted to transmit the drive therefrom to actuate the vehicle, an overrunning clutch including driving and driven members respectively drivingly connected to said driving means and to said driven means, an automatically actuated clutch including clutching members adapted respectively to be driven from said driving means and from said driven means, a plurality of means adapted respectively to drive said clutching members from said driving and driven means, one of said plurality of driving means including reduction gearing for driving one of said clutching members at a speed different from that of the other of said clutching members when said driven means is driven from said driving means through said overrunning clutch, manually operated means including a movable clutching device drivingly connected to one of the first two means aforesaid and adapted for movement to establish a driving connection between said driving and driven means whereby to render said overrunning clutch ineffective, said clutching device providing a driving connection between one of the first two means aforesaid and one of said plurality of driving means when said clutching device is in at least one of its positions of movement, said clutching device having an intermediate position of movement thereof free from driving connection between any of the means aforesaid, a power operated clutch for controlling the drive through said power driving means, and means responsive to operation of said manually operated means for selectively rendering said power operated clutch operative and inoperative.

15. In a driving mechanism for a motor vehicle, power driving means, means driven by said driving means and adapted to transmit the drive therefrom to actuate the vehicle, an overrunning clutch including driving and driven members respectively drivingly connected to said driving means and to said driven means and adapted to transmit a direct one-way drive therebetween, an automatically actuated clutch including clutching members adapted respectively to be driven from said driving means and from said driven means, a plurality of means adapted respectively to drive said clutching members from said driving and driven means and for driving said driven means from and faster than said driving means when said automatically actuated clutch is engaged, one of said plurality of driving means including reduction gearing having a countershaft for driving one of said clutching members at a speed different from that of the other of said clutching members when said driven means is driven from said driving means through said overrunning clutch, and manually operated means including a movable clutching device drivingly connected to one of the first two means aforesaid and adapted for movement to establish a driving connection between said driving and driven means whereby to render said overrunning clutch ineffective, said clutching device providing a driving connection between one of the first two means aforesaid and one of said plurality of driving means when said clutching device is in at least one of its positions of movement.

16. In a driving mechanism for a motor vehicle, power driving means, means driven by said driving means and adapted to transmit the drive therefrom to actuate the vehicle, an overrunning clutch including driving and driven members respectively drivingly connected to said driving means and to said driven means, an automatically actuated clutch including clutching members adapted respectively to be driven from said driving means and from said driven means, a plurality of means adapted respectively to drive said clutching members from said driving and driven means, one of said plurality of driving means including reduction gearing for driving one of said clutching members at a speed different from that of the other of said clutching members when said driven means is driven from said driving means through said overrunning clutch, manually operated means including a movable clutching device drivingly connected to one of the first two means aforesaid and adapted for movement relative to each of said clutching members to establish a driving connection between said driving and driven means whereby to render said overrunning clutch ineffective, said clutching device providing a driving connection between one of the first two means aforesaid and one of said plurality of driving means when said clutching device is in at least one of its positions of movement, means for reversing the normal direction of drive of said driving means, and means actuated in response to said reversing means for moving said clutching device to render said overrunning clutch ineffective as aforesaid.

17. In a power transmission for a motor vehicle having power driving means including a driving shaft and a shaft driven therefrom and adapted to drive the vehicle, said driving and driven shafts being co-axially arranged for relative rotation, an overrunning clutch including inner and outer clutch members one of which is drivingly connected to said driving shaft and the other of which is drivingly connected to said driven shaft for driving said driven shaft from said driving shaft at the same rotational speed and for releasing said drive when said driven shaft overruns said driving shaft, a cylindrical clutching structure having a pawl receiving slot, means for mounting said cylindrical clutching structure for rotation concentrically with said shafts, a second clutching structure having a centrifugal force actuated pawl adapted for engagement in said slot to positively couple said clutching structures when the rotational speeds thereof are substantially the same, means for drivingly connecting one of said clutching structures to said power driving means, means for drivingly connecting the other of said clutching structures to said driven shaft, one of said driving connecting means including a gear train, said clutching structures being driven at relatively different speeds when the driving shaft drives the driven shaft through said overrunning clutch, clutch teeth drivingly connected to said driven shaft, shiftable clutch teeth drivingly connected to said driving shaft, and manually operable means for shifting said shiftable clutch teeth relative to said clutching structures to engage the first said clutch teeth for drivingly connecting said driving and driven shafts independently of said overrunning clutch, one of said drivingly connecting means including at least a portion of said shiftable teeth.

18. In a drive for a motor vehicle having a power driving shaft and a shaft driven therefrom and adapted to drive said vehicle, a speed ratio changing transmission associated with said driving shaft for varying the driving speed thereof and for reversing the direction of drive of said driving shaft, overdriving means between said shafts for driving said driven shaft at a speed greater than the speed of the driving shaft, a speed responsive clutch controlling said overdriving means and including positively engageable clutching structures respectively adapted for driving connection to said driving and driven shafts at least when said structures are clutched, said speed responsive clutch being adapted to automatically connect said shafts through said overdriving means, means drivingly connected to said driving and driven shafts for transmitting a releasable forward direct drive therebetween, a shiftable clutch device normally drivingly connected to one of said shafts and adapted for shift relatively to each of said clutching structures to drivingly connect one of said clutching structures to the last said shaft, and means responsive to reversing the drive of said driving shaft for shifting said clutch device into driving connection with the other of said shafts which is not normally connected to said clutch device whereby to couple said driving and driven shafts for a two-way drive therebetwen.

19. In a vehicle drive, power driving means including a driving shaft, means including a shaft driven by said power driving means and adapted to drive the vehicle, direct driving means including a releasable clutch for driving said driven means from said driving shaft and for releasing the drive to provide relative rotation between said driving and driven shafts, auxiliary means intermediate said driving and driven means for driving said driven means independently of said drive through said direct driving means and at a speed greater than that of said driving means, a second clutch adapted to control the drive between said driving means and said auxiliary driving means, manually controlled means for reversing the direction of drive of said driving shaft, and means including a clutch device drivingly connected to one of said shafts and shiftable to drivingly couple said shafts for a reverse drive in response to actuation of said manually controlled means accompanied by a reverse drive of said driving shaft, and means for drivingly connecting said auxiliary driving means to said clutch device when the latter occupies at least one of its positions of shifting movement whereby to drivingly connect said auxiliary driving means to the shaft which is drivingly connected to said clutch device as aforesaid.

20. The combination with a driving shaft and a driven shaft, of a gearing for establishing a drive from the driving shaft to the driven shaft at a different speed than that of the driving shaft, a clutch having a pair of clutching members arranged to automatically establish a two-way drive between said driving and driven shafts through said gearing when the driven shaft reaches a predetermined speed, a one-way clutch for establishing a one to one drive between said driving and driven shafts, a two-way clutch including clutching members respectively drivingly connected to said driving and driven shafts for establishing a one to one drive between said driving and driven shafts independently of said one-way clutch and means within the control of the operator for selectively engaging the members of said two-way clutch, or for shifting one of the last said clutch members into engagement with one of the members of the automatic clutch for connecting the same to the driving shaft, with said one-way clutch operatively connecting said shafts.

21. The combination with a driving shaft and a driven shaft, of a gearing for driving said driven shaft at a different rate of speed than the driving shaft, a one-way clutch for driving said driven shaft from the driving shaft, an automatic clutch having a pair of clutching members arranged for establishing a two-way drive between said shafts through said gearing when the speed of the driven shaft reaches a predetermined point, and means within the control of the operator for establishing a two-way drive between said shafts independently of said one-way clutch or of said gearing, or connecting one of the members of the automatic clutch to the driving shaft with said one-way clutch operatively connecting said shafts, whereby while the speed of the driven shaft remains below a predetermined point a one-way drive will be established between said shafts, and when the speed of the driven shaft reaches a predetermined point a two-way drive will be established between said shafts through the instrumentality of the members of said automatic clutch and said gearing, the last said means including a clutching element drivingly connected to said driving shaft and adapted for connection with said driven shaft or with the last said automatic clutch member.

22. The combination with a driving shaft and a driven shaft, of a gearing for driving the driven shaft at a different speed than that of the driving shaft, a clutch for establishing driving relation between said shafts through said gearing comprising a dog-carrying member having centrifugally operated dogs mounted thereon and means for biasing said dogs in disengaging position until the speed of the member reaches a predetermined point, and a dog-engaged clutch member, the dogs and the dog-engaged member being so related that they will engage when the parts are substantially in synchronism, the dog-engaged member being driven when the clutch is disengaged at a greater speed than the dog-carrying member, and means within the control of the operator for connecting one of the members of said clutch to the driving shaft while maintaining the relationship of the gears constant.

23. The combination with a driving shaft and a driven shaft, of a gearing for establishing a drive from the driving shaft to the driven shaft, a different speed than that of the driving shaft, a clutch for automatically establishing a two-way drive between said driving and driven shafts through said gearing when the driven shaft reaches a predetermined speed, a one-way clutch for establishing a one to one drive between said driving and driven shafts, a shiftable member having clutch teeth for engagement with clutch teeth drivingly connected with one of the members of said gearing to connect said one member with the driving shaft and shiftable to engage the teeth thereof with teeth on the driven shaft for directly connecting the driving and driven shafts and rendering said automatic clutch inoperative.

24. In a driving mechanism for a motor vehicle, power driving means, means driven by said power driving means and adapted to drive the vehicle, an overrunning clutch between said driving and driven means adapted to transmit a direct drive from said driving means to said driven means and to permit said driven means to overrun said driving means, supplemental driving means adapted for drivingly connecting said driving means and said driven means for driving said driven means from said driving means at a speed ratio greater than that provided by said overrunning clutch, clutch means controlling said supplemental driving means, said clutch means including clutching members respectively driven with said driving means and said driven means, a clutch device driven by one of the first two means aforesaid, and means for selectively shifting said clutch device to a plurality of positions to respectively provide the drive to one of said members and to drivingly connect said driving and driven means for locking said overrunning and driven means for locking said overrunning clutch against overrunning action, said clutch means being adapted, when said clutch device is positioned to drive one of said clutching members, to engage said members automatically in response to a predetermined synchronization of the rotation of said clutching members, said overrunning clutch comprising driving and driven overrunning clutch elements respectively drivingly connected to said driving means and said driven means independently of said clutch device.

25. In a driving mechanism for a motor vehicle, power driving means, means driving by said power driving means and adapted to drive the vehicle, an overrunning clutch between said driving and driven means adapted to transmit a direct drive from said driving means to said driven means and to permit said driven means to overrun said driving means, supplemental driving means adapted for drivingly connecting said driving means and said driven means for driving said driven means from said driving means at a speed greater than that provided by said overrunning clutch, clutch means including clutching structures drivingly associated with said supplemental driving means for controlling the drive through said supplemental driving means, and manually controlled clutch means driven by one of the first two means aforesaid and adapted for selective positioning to drivingly connect one of said clutching structures to one of the first two means aforesaid for selectively rendering said clutch means and said overruning clutch ineffective, said supplemental driving means including planetary gearing, said overrunning clutch comprising driving and driven overrunning clutch elements respectively drivingly connected to said driving means and said driven means independently of said manually controlled clutch means.

26. In a driving mechanism for a motor vehicle, power driving means, means driven by said driving means and adapted to transmit the drive therefrom to actuate the vehicle, an overrunning clutch including driving and driven members one of which is adapted to be driven by said driving means and the other of which is adapted to drive said driven means, an automatically actuated clutch including clutching members adapted respectively to be driven from said driving means and from said driven means, a plurality of means adapted respectively to drive said clutching members from said driving and driven means, one of said plurality of driving means including reduction gearing for driving one of said clutching members at a speed different from that of the other of said clutching members when said driven means is driven from said driving means through said overrunning clutch, and manually operated means including a movable clutching device drivingly connected to one of the first two means aforesaid and adapted for movement to establish a driving connection between said driving and driven means whereby to render said overrunning clutch ineffective, said clutching device providing a driving connection between one of the first two means aforesaid and one of said plurality of driving means when said clutching device is in at least one of its positions of movement, said clutching device being free from driving connection with at least one of said plurality of driving means when moved as aforesaid to render said overrunning clutch ineffective.

27. In a transmission, the combination with an axially stationary driving shaft, of a driven shaft in axial alignment with the driving shaft and having piloted engagement therewith, said driven shaft having one member of an overrunning clutch and a ring gear connected therewith, a planetary gear train for operating the driven shaft at a greater speed than the driving shaft and including a centrifugally-operated clutch for connecting said driving shaft and said driven shaft through said gear train, a second member of an overrunning clutch connected to the driving shaft, a two-way clutch member connected to the driven shaft and located between said automatic clutch and said overrunning clutch and an axially-shiftable member shiftable independently of the driving shaft for selectively connecting one member of the centrifugally-operated clutch to the driving shaft or the driving shaft to the driven shaft through said two-way clutch member.

28. In a power driving mechanism having a driving shaft and a shaft driven therefrom, releasable clutching means intermediate said shafts adapted to transmit a direct drive from the driving shaft to the driven shaft, speed responsive clutch means including driving and driven clutching structures adapted for clutching action in response to substantially synchronized rotation thereof at or above a predetermined speed, means for driving one of said structures from said driving shaft and at the same speed as that of said driving shaft, and means including a countershaft gear train for driving the other of said structures from said driven shaft and at a speed less than that of said driving shaft, said driving means being adapted to drive said structures at said relatively different speeds when said driving shaft drives said driven shaft through said direct drive releasable clutching means, said clutching structures being adapted to establish a positive overdrive from said driving shaft to said driven shaft through said driving means subsequently to release of said releasable clutching means and in response to reducing the rotational speed of the driving shaft to effect approximate synchronized rotation of said clutching structures.

WILLIAM T. DUNN.

CERTIFICATE OF CORRECTION.

Patent No. 2,159,430.             May 23, 1939.

WILLIAM T. DUNN.

It is hereby certified that error appears in the printed specification of the above numbered patent requiring correction as follows: Page 3, second column, line 22, for "hub 5" read hub 51; page 4, second column, line 49, for "shell 14" read shell 44; page 7, first column, line 31, claim 1, before "structures" insert clutching; same page, second column, line 60, claim 5, for "cluch" read clutch; and that the said Letters Patent should be read with this correction therein that the same may conform to the record of the case in the Patent Office.

Signed and sealed this 5th day of December, A. D. 1939.

(Seal)                                 Henry Van Arsdale,
                                     Acting Commissioner of Patents.

vice is in at least one of its positions of movement, said clutching device being free from driving connection with at least one of said plurality of driving means when moved as aforesaid to render said overrunning clutch ineffective.

27. In a transmission, the combination with an axially stationary driving shaft, of a driven shaft in axial alignment with the driving shaft and having piloted engagement therewith, said driven shaft having one member of an overrunning clutch and a ring gear connected therewith, a planetary gear train for operating the driven shaft at a greater speed than the driving shaft and including a centrifugally-operated clutch for connecting said driving shaft and said driven shaft through said gear train, a second member of an overrunning clutch connected to the driving shaft, a two-way clutch member connected to the driven shaft and located between said automatic clutch and said overrunning clutch and an axially-shiftable member shiftable independently of the driving shaft for selectively connecting one member of the centrifugally-operated clutch to the driving shaft or the driving shaft to the driven shaft through said two-way clutch member.

28. In a power driving mechanism having a driving shaft and a shaft driven therefrom, releasable clutching means intermediate said shafts adapted to transmit a direct drive from the driving shaft to the driven shaft, speed responsive clutch means including driving and driven clutching structures adapted for clutching action in response to substantially synchronized rotation thereof at or above a predetermined speed, means for driving one of said structures from said driving shaft and at the same speed as that of said driving shaft, and means including a countershaft gear train for driving the other of said structures from said driven shaft and at a speed less than that of said driving shaft, said driving means being adapted to drive said structures at said relatively different speeds when said driving shaft drives said driven shaft through said direct drive releasable clutching means, said clutching structures being adapted to establish a positive overdrive from said driving shaft to said driven shaft through said driving means subsequently to release of said releasable clutching means and in response to reducing the rotational speed of the driving shaft to effect approximate synchronized rotation of said clutching structures.

WILLIAM T. DUNN.

CERTIFICATE OF CORRECTION.

Patent No. 2,159,430.        May 23, 1939.

WILLIAM T. DUNN.

It is hereby certified that error appears in the printed specification of the above numbered patent requiring correction as follows: Page 3, second column, line 22, for "hub 5" read hub 51; page 4, second column, line 49, for "shell 14" read shell 44; page 7, first column, line 31, claim 1, before "structures" insert clutching; same page, second column, line 60, claim 5, for "cluch" read clutch; and that the said Letters Patent should be read with this correction therein that the same may conform to the record of the case in the Patent Office.

Signed and sealed this 5th day of December, A. D. 1939.

(Seal)                        Henry Van Arsdale,
                               Acting Commissioner of Patents.